United States Patent [19]
Hamerski

[11] Patent Number: 5,593,120
[45] Date of Patent: Jan. 14, 1997

[54] QUICK-MOUNTING FASTENING ASSEMBLY

[75] Inventor: Michael D. Hamerski, Baldwin Township, St. Croix County, Wis.

[73] Assignee: Minnesota Mining and Manufacturing Company, St. Paul, Minn.

[21] Appl. No.: 342,715

[22] Filed: Nov. 21, 1994

[51] Int. Cl.$^6$ .................................................. A47G 29/00
[52] U.S. Cl. ...................... 248/205.3; 248/467; 156/73.5; 156/249; 156/235
[58] Field of Search ................................. 248/205.3, 544, 248/467, 489, 479, 222.52, 294.1; 156/71, 73.5, 249, 308.2, 235, 230

[56] References Cited

U.S. PATENT DOCUMENTS

| | | | |
|---|---|---|---|
| 2,385,296 | 9/1945 | Moore | 248/304 |
| 2,765,998 | 10/1956 | Engert | 248/467 |
| 3,300,173 | 1/1967 | Kennedy, Jr. | 248/467 |
| 3,446,688 | 5/1969 | Flax | 156/423 |
| 3,468,732 | 9/1969 | Hewitt | 156/73 |
| 3,689,334 | 9/1972 | Dermody et al. | 156/73 |
| 3,848,843 | 11/1974 | Levy | 248/224 |
| 3,866,873 | 2/1975 | Bohli | 248/205.3 |
| 4,338,151 | 7/1982 | Hutter, III | 156/344 |
| 4,477,307 | 10/1984 | Cearlock et al. | 156/580 |
| 4,508,581 | 4/1985 | Rohringer | 156/73 |
| 4,551,189 | 11/1985 | Peterson | 156/73.5 |
| 4,566,924 | 1/1986 | Hara et al. | 156/73.5 |
| 4,636,124 | 1/1987 | Gugle et al. | 411/82 |
| 4,780,035 | 10/1988 | Shibayama et al. | 156/73.5 |
| 4,822,224 | 4/1989 | Carl et al. | 411/82 |
| 4,822,656 | 4/1989 | Hutter, III | 428/40 |
| 4,842,912 | 6/1989 | Hutter, III | 428/65 |
| 4,923,159 | 5/1990 | Wang et al. | 248/205.3 |

FOREIGN PATENT DOCUMENTS

| | | |
|---|---|---|
| A0219217 | 4/1987 | European Pat. Off. . |
| 1407064 | 11/1963 | France . |
| A2252913 | 6/1975 | France . |
| A02248236 | 10/1990 | Japan . |

OTHER PUBLICATIONS

International Search Report PCT/US95/13210.

*Primary Examiner*—Ramon O. Ramirez
*Assistant Examiner*—Anita M. King
*Attorney, Agent, or Firm*—Gary L. Griswold; Walter N. Kirn; William L. Huebsch

[57] ABSTRACT

A quick-mounting fastening assembly including a fastening structure having an initial attachment surface, and a main attachment surface that is approximately co-planar with the initial attachment surface. A layer of pressure-sensitive adhesive over the initial attachment surface affords adhering the fastening structure to a substrate by pressing the layer of pressure sensitive adhesive against the substrate. A layer of hot-melt adhesive covering the main attachment surface can then be heated by friction in one of several ways to melt the layer of hot-melt adhesive so that upon cooling the layer of hot melt adhesive will be adhered to the surface of the substrate.

20 Claims, 6 Drawing Sheets

QUICK-MOUNTING FASTENING ASSEMBLY

FIELD OF THE INVENTION

The invention concerns a fastening assembly that can be mounted in seconds on a wall, a ceiling, a cabinet, a support, a workpiece, or other substrate and then put to immediate use to mount articles such as a fixture, a picture, or a conduit. More specifically, the invention concerns a quick-mounting fastening assembly that bears a hot-melt adhesive by which it can be permanently bonded to a surface, e.g., by "spin welding" or "friction welding" (that is, spinning an adhesive-bearing device against a surface until the frictional heat melts the adhesive, then stopping the rotation to allow the adhesive to congeal to form a bond between the device and the surface). The term "hot-melt adhesive" is here used to encompass "heat-activated adhesive" and "thermoplastic adhesive".

DESCRIPTION OF THE RELATED ART

In U.S. Pat. No. 4,566,924 (Hara et al.), a stud is permanently bonded to a workpiece by spin welding. In FIG. 4 of the Hara patent, a stud 1 has a base 3 with a recess 6 into which a hot-melt adhesive 4 has been deposited. While pressing the adhesive against a workpiece 5, a rotary tool engages the shank 2 of the stud to rotate the stud at a fairly high speed so that friction between opposed faces of the hot-melt adhesive and the workpiece generates heat to melt the adhesive. The Hara patent says that "when the stud adheres to the workpiece, the tool will sense the completion of the adhesion by breaking the projected portion 3' [see FIG. 2(A)] and will come to a stop" (col. 3, lines 35–37). When the rotation stops, the adhesive cools and solidifies, thus bonding the stud to the workpiece. The shank of the stud of Hara FIG. 1 can be used for retaining an electric cable or some other wire material; that of FIG. 2, for swingably retaining the ball of a ball joint; and that of FIG. 3, for attaching a molding to an automobile body.

U.S. Pat. No. 4,477,307 (Cearlock et al.) says known spin welding involved the problem of melting the adhesive sufficiently to create the desired bond without overheating the adhesive to the point of combustion. To overcome this problem, a stud-like fastening element 42 of Cearlock FIG. 4 has a tapered base 46 so that the central portion melts first. After the melting reaches the periphery of the base, a peripheral protrusion 50, by which a special tool rotates the fastening element, is sheared off, thus stopping the rotation and preventing overheating.

U.S. Pat. No. 4,636,124 (Gugle et al.) says: "Friction weld fastener systems, such as disclosed in U.S. Pat. No. 4,477,307, do not provide adequate adhesion with some surfaces such as wood or painted metal. One known manner of increasing the adhesion characteristics for such surfaces is to add a heat activated adhesive pellet at the center of the friction weld fastener. Upon axial and rotational forces being applied to the base of the fastener, the heat-activated adhesive melts and spreads across the friction weld surface" (col. 1, lines 10–18). The Gugle patent concerns means for providing even distribution of adhesive from the pellet.

None of the fastening assemblies discussed above have any means to keep them from moving laterally or "walking" on a hard surface while the adhesive is being frictionally heated.

A thermoplastic button 20 of FIGS. 1 and 2 of U.S. Pat. No. 3,468,732 (Hewett) is spin welded to the abutting edges of two thermoplastic sheets, thus welding the sheets together. A tip 22a at the conical working face of the button acts like a center punch to prevent skidding or skating of the button on the surface of the sheets (col. 3, lines 22–27). The stud-like fastening element 42 of FIG. 4 of the Cearlock patent has a similar protrusion 48, but I fail to find any mention of its utility in the Cearlock specification.

U.S. Pat. No. 4,842,912 (Hutter III) does not employ spin welding, but its FIG. 25 spins a foot plate 24, the broad face of which bears a "bonding agent," and the effect of the spinning is "to rupture and/or intermix the bonding agent to initiate activation of bonding agent curing" (col. 11, lines 10–13). The quoted language may be better understood with reference to FIG. 23 wherein "discrete beads 116 and 118 of different bonding agent compositions may be applied to the foot plate 24, wherein intermixing of the two compositions initiates a curing process" (col. 10, line 57–61), thus adhesively bonding the foot plate to a substrate 12.

In other figures of the Hutter III drawing, a foot plate is bonded to a substrate by a bonding agent 20 which "may comprise a hot melt or thermoset adhesive material" (col. 10, lines 21–23). Of such figures, FIGS. 16–20 are of particular interest to the present invention because the mounting fixture 18 of FIGS. 16–20 is "secured at least temporarily to the substrate 12 by means of the pressure sensitive adhesive 100" (col. 10, lines 4–6) on the connector rim 98 of the mounting fixture 18, as best seen in FIG. 20. In FIGS. 16–20, the bonding agent 20, which "may comprise a hot melt or thermoset adhesive material" (col. 10, lines 21–22), is activated by heat conducted downwardly as indicated by arrows 112 of FIG. 19.

A circular wafer that conducts heat to fuse a hot-melt adhesive is employed in the Hang Fast™ wall mounting system of Sears Roebuck and Co., Chicago, Ill. which is identical to the prior art shown in FIGS. 1–3 of U.S. Pat. No. 4,923,159 (Wang et al.). As shown in the Wang patent, a plastic mounting disk (B) has a thin membrane (B2), one surface of which is covered by a hot-melt adhesive layer (B3). A heating device which contacts the membrane (B2) presses the adhesive layer (B3) against a support, and heat conducted through the membrane fuses the adhesive to bond the disk to the support. The mounting disk is formed with a peripheral flange which acts as a seat for a hook, like that shown in FIG. 6 of the Wang patent.

SUMMARY OF THE INVENTION

The present invention provides a fastening assembly which can be quickly positioned on a flat surface of a ceiling, a wall, a cabinet, a support, a workpiece, or other substrate and prevented from moving laterally or "walking" while being frictionally welded to that surface.

The novel quick-mounting fastening assembly according to the present invention includes a fastening structure having an initial attachment surface and a main attachment surface that is approximately co-planar with the initial attachment surface. A layer of pressure-sensitive adhesive on the initial attachment surface affords adhering the fastening assembly to a substrate by pressing it against that substrate. A layer of hot-melt adhesive is on the main attachment surface; and frictional heating means is provided for affording sufficient frictional heating to melt the layer of hot-melt adhesive with the layer of pressure sensitive adhesive adhered to the substrate so that when the layer of hot melt adhesive again solidifies, it will be adhered to the substrate.

In certain embodiments the fastening structure includes an inner portion having the main attachment surface; and an outer portion having the initial attachment surface, with the initial attachment surface encompassing the main attachment surface.

In one such embodiment, the outer portion has a through circular opening; the inner portion is generally circular about an axis normal to the main attachment surface; the inner and outer portions include means mounting the inner portion for rotation within the outer portion, and the frictional heating means comprises driving engagement means on the inner portion for releasably connecting the inner portion to a source of rotational power to rotate the inner portion about its axis with the layer of hot-melt adhesive in contact with the substrate surface to melt the layer of hot-melt adhesive. That inner portion can have a coaxial socket shaped to receive the end of a drive member, which socket can be formed in a stud-like part projecting coaxially on the side of the inner portion opposite the main attachment surface.

In another such embodiment the outer and inner portions are fixed to or integral with each other, the inner portion has a generally planar friction surface opposite and generally parallel to the main attachment surface, the inner portion has a thin cross sectional area and is of a material (e.g., metal or heat resistant polymeric material) adapted to conduct heat energy between the friction surface and the main attachment surface, the fastening structure has a socket defined by surfaces including the friction surface, and the fastening assembly further includes a friction disk having a planar friction surface, means mounting the friction disk in the socket with the friction surfaces adjacent for rotation about an axis normal to the friction surfaces, and driving engagement means on the friction disk for releasably connecting the friction disk to a source of rotational power to rotate the friction disk about the axis with the friction surfaces in contact to heat the inner portion and thereby melt the layer of hot-melt adhesive by heat transfer through the inner portion. That friction disk can have a coaxial socket shaped to receive the end of a drive member, which socket can be formed in a stud-like part projecting coaxially on the side of the friction disk opposite the main attachment surface.

In yet another such embodiment of the fastening assembly the outer and inner portions are attached to or integral with each other, the inner portion has a generally planar friction surface opposite and generally parallel to the main attachment surface, the inner portion is of a material (e.g., metal or heat resistant polymeric material) adapted to conduct heat energy between the friction surface and the main attachment surface, and the fastening structure has a socket defined by surfaces including the friction surface adapted to receive and have a friction disk (which is not a part of the fastening assembly) rotated therein with a planar friction surface on the friction disk in contact with the friction surface on the inner surface to heat and thereby melt the layer of hot-melt adhesive by heat transfer through the inner portion.

After the latter two embodiments have been frictionally welded to a substrate, they can be removed by frictionally heating the hot-melt adhesive in the same way it was initially hearted to apply the fastening assembly, which removal is facilitated if the pressure-sensitive adhesive is repositionable.

In all of the embodiments the initial attachment surface can extend entirely around the main attachment surface so that it and the layer of pressure sensitive adhesive form an encircling dam to retain the layer of hot-melt adhesive when it is melted; and the outer portion can include a radially outwardly projecting flange spaced from the initial attachment surface so that means for engaging the fastening assembly can be received around the periphery of the outer portion between the flange and a surface to which the attachment assembly is adhered.

The inner and outer portions of any of the embodiments can be of a polymeric material and can be formed by injection molding. In each of the latter two embodiments, the inner and outer portions can be a single piece of tough, heat-resistant polymeric material such as high-temperature polycarbonate, polyphenylene sulfide, polyether imide, or polysulfone, with the inner portion preferably being from 0.25 to 1.25 mm (0.010 to 0.050 inch) in thickness between its friction and main attachment surfaces. At thicknesses substantially below that range, the inner portion might have insufficient strength while thicknesses substantially above that range might excessively slow the melting of the hot-melt adhesive. An inner portion of metal (e.g., steel, aluminum, or copper) in either of the latter two embodiments affords rapid heating of the hot-melt adhesive, but adds to the expense of the fastening assembly.

The pressure-sensitive adhesive used on the initial attachment surface of the fastening assembly preferably is repositionable to enable the fastening assembly to be positioned with precision before frictionally heating the hot-melt adhesive. Preferred repositionable pressure-sensitive adhesives are based on hollow tacky microspheres as disclosed in co-assigned U.S. Pat. No. 5,045,569 (Delgado) or solid tacky microspheres as disclosed in co-assigned U.S. Pat. No. 3,691,140 (Silver). When the pressure-sensitive adhesive does not need to be repositionable, a preferred class is disclosed in U.S. Pat. No. Re. 24,906 (Ulrich). Whether or not repositionable, a pressure-sensitive adhesive is viscoelastic, is permanently tacky at ordinary room temperatures, and adheres instantaneously to most surfaces under fingertip pressure.

In each embodiment of the fastening assembly, the layer of pressure-sensitive adhesive on the initial attachment surface has or can have several functions: 1) it resists any tendency of the frictional heating means to laterally move or "walk" the fastening assembly out of position, 2) it can (if it is continuous around the inner portion) act as a dam to contain melted hot-melt adhesive within the outer portion, 3) it holds the fastening structure in place while the hot-melt adhesive cools, and 4) when the pressure-sensitive adhesive is repositionable, it allows the fastening assembly to be positioned temporarily while the installer checks the accuracy of its position. When the pressure-sensitive adhesive is not repositionable, it can enhance the holding force of the fastening assembly.

The layer of pressure-sensitive adhesive on the initial attachment surface preferably has a uniform thickness of at least 50 mm (0.002 inch), more preferably at least 100 mm (0.004 inch) to permit the fastening assembly to be adhered to a rough substrate such as a concrete block and, when so adhered, to be more effective to prevent walking and, when so used, as a dam for the melted hot-melt adhesive. To attain preferred thicknesses, the pressure-sensitive adhesive preferably includes a layer selected from 1) a pressure-sensitive adhesive foam, 2) a foam-like pressure-sensitive adhesive such as is disclosed in co-assigned U.S. Pat. No. 4,223,067 (Levens), and 3) a polymeric foam web; however, a thick layer of pressure sensitive adhesive could also be used. Each of those foam and foam-like layers provides the additional benefit of being temporarily compressible to allow the hot-melt adhesive to be pushed, if necessary, into contact with a substrate to which the fastening assembly is being bonded.

The hot-melt adhesive used on the main attachment surface of the fastening structure can be based on any polymeric material which is strong, tough and non-tacky at ordinary room temperatures, fuses at moderately elevated temperatures to form strong bonds to common building materials such as concrete, wood, metal, and paint, and does not produce any volatiles when fused. Typical hot-melt adhesives are based on polyethylene, polyamides, polyvinyl acetate, and hydrocarbon resins. Useful commercially available hot-melt adhesives include the "Versamid" and "Macromelt" adhesives from Henkel and those sold under the trade designation "Jet-melt adhesives Nos. 3762LM and 3738 by Minnesota Mining and Manufacturing Company, St. Paul, Minn.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
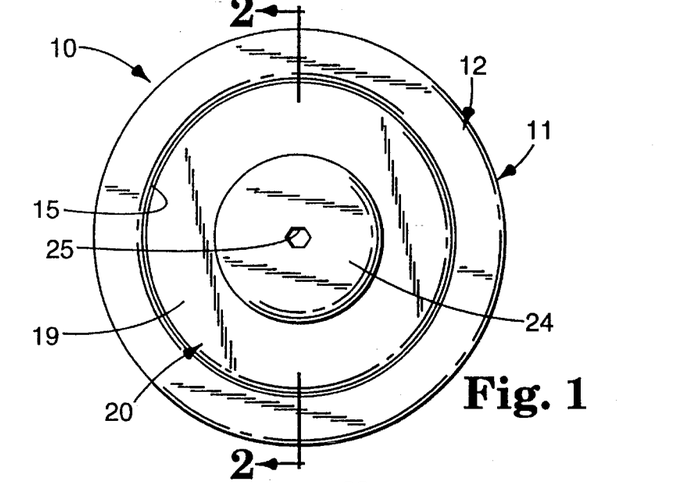
FIG. 1 is a top view of a first embodiment of a quick-mounting fastening assembly according to the present invention.
Figure 2:
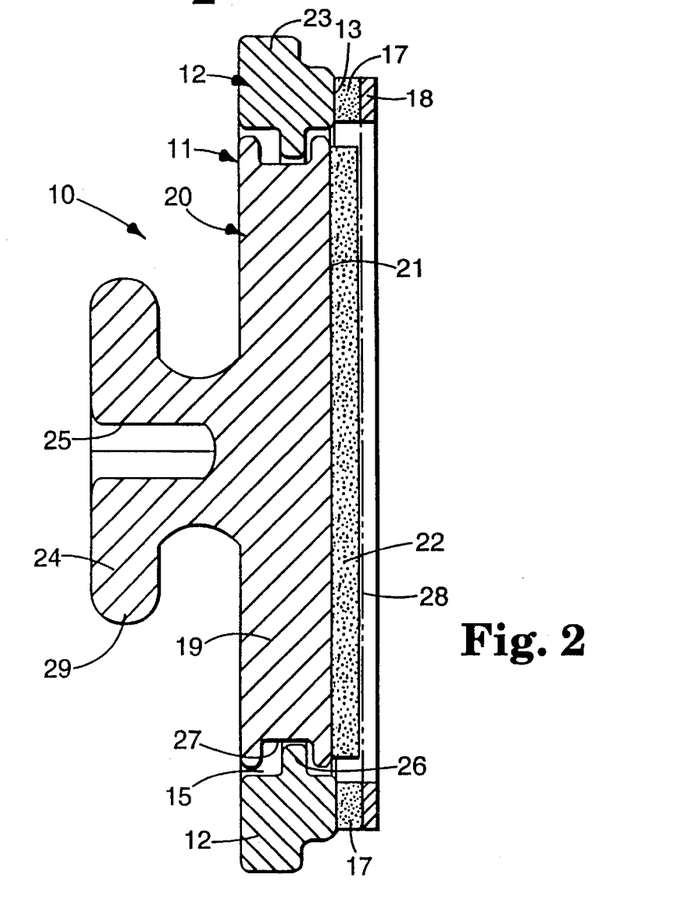
FIG. 2 is a cross sectional view taken approximately along line 2—2 of FIG. 1.

FIGS. 1 and 2 illustrate a first embodiment of a quick-mounting fastening assembly according to the present invention generally designated by the reference numeral 10. The fastening assembly 10 includes a fastening structure 11 including a generally circular outer portion 12 which has an annular generally planar initial attachment surface 13 and a central opening 15. Covering the initial attachment surface 13 is a layer 17 of pressure-sensitive adhesive that preferably is a foamed or foam-like layer and is protected by a removable release liner 18. Coaxially positioned within the central opening 15 and totally encompassed by the outer portion 12 is a disk-shaped part 19 of an inner portion 20 of the fastening structure 11. The inner portion 20 has a planar main attachment surface 21 that is approximately co-planar with the initial attachment surface 13 and faces in the same direction as the initial attachment surface 13. The main attachment surface 21 is covered by a layer 22 of hot-melt adhesive. The inner portion 20 also includes a stud-like part 24 projecting from the side of the disk-shaped part 19 opposite its main attachment surface 21, which stud-like part has a socket 25 with an hexagonal cross section that is coaxial with the stud-like part 24 and the disk-shaped part 19 of the inner portion 20.

The outer portion 12 includes a circular radially inwardly projecting ridge 26, and the outer and inner portions 12 and 20 have sufficient resilient flexibility to permit the disk-shaped part 19 of the inner portion 20 to be pushed into the central opening 15 until the ridge 26 loosely fits into a circumferential recess 27 around the disk-shaped part 19. As is shown in FIG. 2, the loose fit (1) permits the layer 17 of pressure-sensitive adhesive (after removal of the release liner 18) to adhere to a flat substrate (indicated by a phantom line 28), (2) permits the exposed face of the layer 22 of hot-melt adhesive to be pushed into full contact with the substrate by a rotary tool (not shown) in driving engagement in the hexagonal socket 25, and enables the inner portion 20 to be rotated freely within the outer portion 12. At the rotational speed of an ordinary household drill (e.g., 2,250 RPM) the typical layer 22 of hot-melt adhesive melts within a few seconds. As soon as the adhesive melts, the tool is stopped, and the layer 22 of melted hot-melt adhesive quickly congeals or solidifies to bond the fastening assembly 10 to the substrate.

A radially outwardly projecting flange 29 around and included in the stud-like part 24 can be releasably engaged by any of a variety of devices such as a flexible clip that can retain cables, wires, cords, and the like. Also, the outer portion 12 comprises a flange 23 projecting radially outwardly of the outer periphery of the initial attachment surface 13. The flange 23 is spaced from the initial attachment surface 13 and the outer portion has a peripheral surface between the flange 23 and the outer periphery of the initial attachment surface 13 adapted to receive means (e.g., a picture wire) for engaging the fastening assembly to seat or attach various articles after the fastening assembly 10 has been mounted on a substrate.

Figure 3:
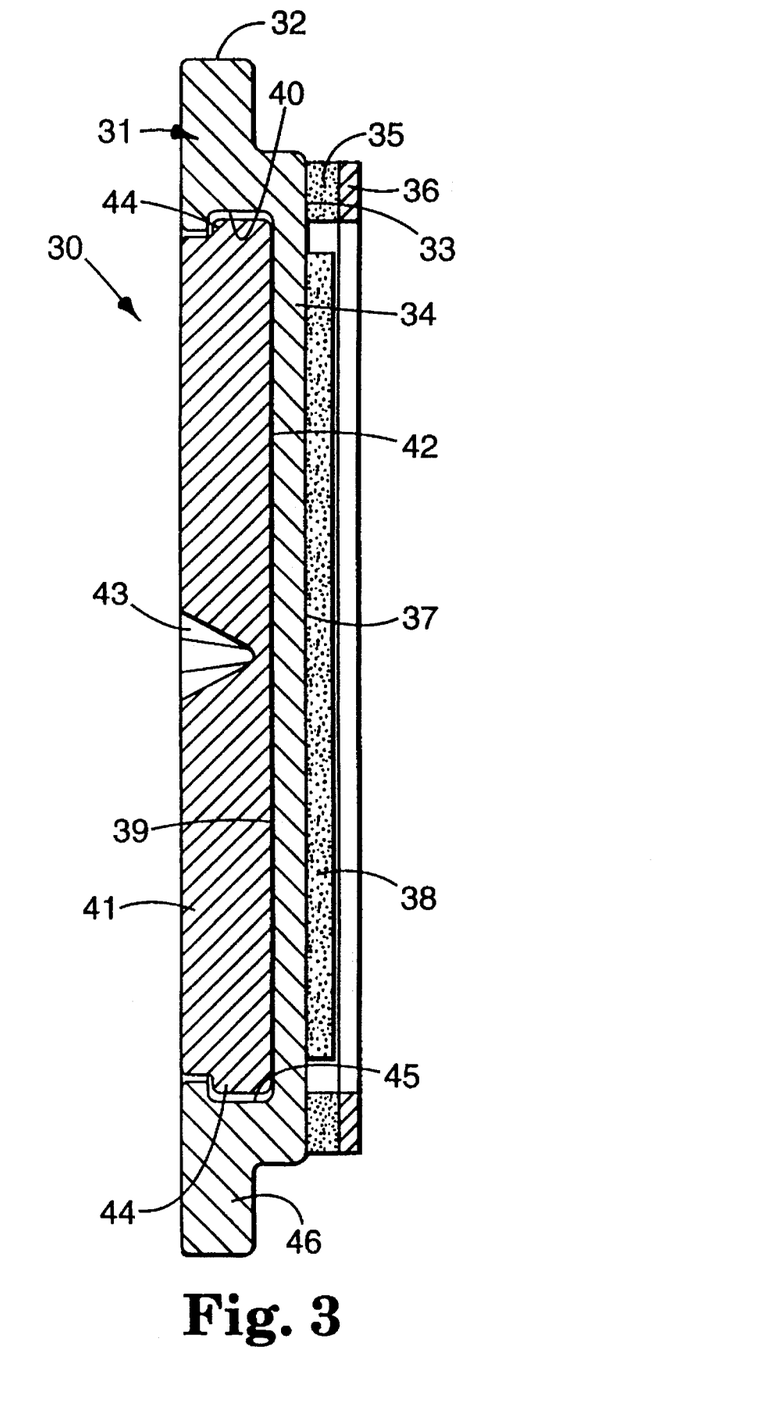
FIG. 3 is a central cross sectional view through a second embodiment of a quick-mounting fastening assembly according to the present invention.

While the fastening assembly 10 of FIGS. 1 and 2 would be difficult to remove from a substrate, a quick-mounting fastening assembly 30 illustrated in FIG. 3 can be easily removed from a substrate to which it has been bonded. The fastening assembly 30 includes a fastening structure 31 including a circular outer portion 32 which has an annular generally planar initial attachment surface 33 covered by a layer 35 of pressure-sensitive adhesive that preferably is a foamed or foam-like layer and is protected by a removable release liner 36. The fastening structure 31 also includes an inner portion 34 that has a main attachment surface 37 covered by a layer 38 of hot-melt adhesive that is about co-planar with, but is slightly recessed with respect to the face of the layer 35 of pressure-sensitive adhesive, and a generally planar friction surface 39 opposite and generally parallel to its main attachment surface 37. The inner portion 34 has a thin cross sectional area adapted to conduct heat energy between the friction surface 39 and the main attachment surface 37. The fastening structure 31 has a socket 40 defined by its surfaces including the friction surface 39, and the fastening assembly 30 further includes a friction disk 41 having a planar friction surface 42, means mounting the friction disk 41 in the socket 40 with the friction surfaces 39 and 42 adjacent for rotation about an axis normal to the friction surfaces 39 and 42, and driving engagement means provided by a socket 43 shaped to receive the tip of a "Phillips" type screw driver (not shown) in the friction disk 41 for releasably connecting the friction disk 41 to a source of rotational power to rotate the friction disk 41 about its axis with the friction surfaces 39 and 42 in contact to heat the inner portion 34 and thereby melt the layer of hot-melt adhesive by heat transfer through the inner portion 34. The means mounting the friction disk 41 in the socket 40 is provided by a peripheral rim 44 of the friction disk 41 that is loosely received in a circular recess 45 in the outer portion 32. The outer portion 32 and the friction disk 41 together have sufficient resilience to permit the peripheral rim 44 of the friction disk 41 to be pushed into the circular recess 45 until it loosely fits in the recess 45.

To mount the fastening assembly 30 onto a substrate (not shown), the release liner 36 is removed and the layer 35 of pressure-sensitive adhesive is pressed against a flat surface of the substrate. After inserting the tip of a "Phillips" type screw driver mounted in a rotary tool into the socket 43 and thereby rotating the friction disk 41, friction between the friction surfaces 42 and 39 of the rotating friction disk 41 and the inner portion 34 generates heat that is conducted through the inner portion 34 to melt the layer 38 of hot-melt adhesive and thereby bond the fastening assembly 30 to the substrate after rotation of the friction disk 41 is stopped so that the hot melt adhesive is again allowed to solidify.

The outer portion 32 comprises a flange 46 projecting radially outwardly of the outer periphery of the initial attachment surface 33. The flange 46 is spaced from the initial attachment surface 33 and the outer portion 32 has a peripheral surface between the flange 46 and the outer periphery of the initial attachment surface 33 adapted to receive means (e.g., a picture wire) for engaging the fastening assembly to support various articles or implements after the fastening assembly 30 has been mounted on a substrate.

Figure 4:
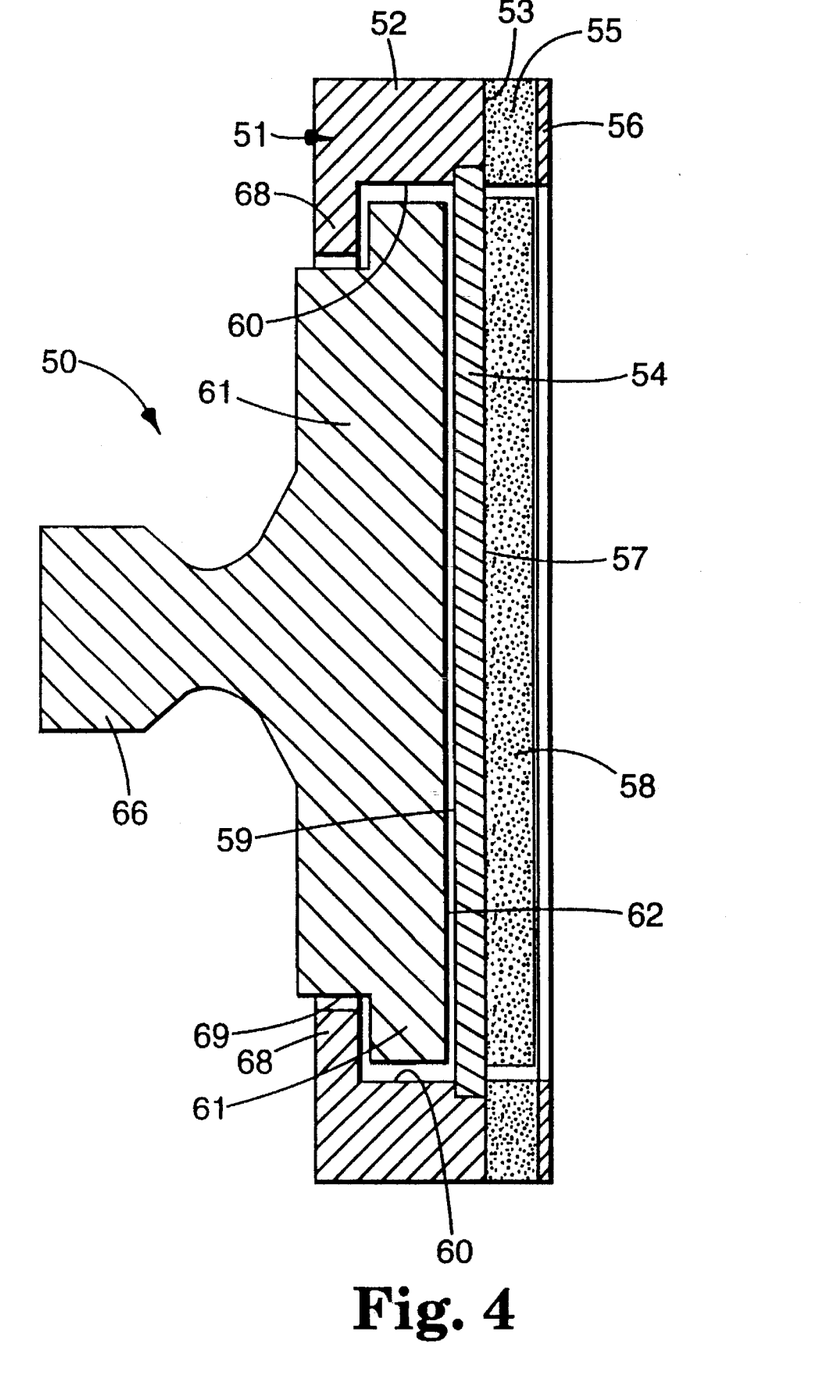
FIG. 4 is a central cross sectional view through a third embodiment of a quick-mounting fastening assembly according to the present invention.

FIG. 4 illustrates a quick-mounting fastening assembly 50 which, like the fastening assembly 30 illustrated in FIG. 3, can be easily removed after being bonded to a substrate. The fastening assembly 50 includes a fastening structure 51 including a circular polymeric outer portion 52 which has an annular generally planar initial attachment surface 53 covered by a layer 55 of pressure-sensitive adhesive that preferably is a foamed or foam-like layer and is protected by a removable release liner 56, and a metal inner portion 54 fixed around its periphery in the outer portion 52 that has a main attachment surface 57 covered by a layer 58 of hot-melt adhesive having a face that is about co-planar with, but is slightly recessed with respect to the face of the layer 55 of pressure-sensitive adhesive, and a generally planar friction surface 59 opposite and generally parallel to its main attachment surface 57. The metal inner portion 54 has a thin cross sectional area adapted to conduct heat energy between the friction surface 59 and the main attachment surface 57. The fastening structure 51 has a socket 60 defined by its surfaces including the friction surface 59, and the fastening assembly 50 further includes a friction disk 61 having a planar friction surface 62, means mounting the friction disk 61 in the socket 60 with the friction surfaces 59 and 62 adjacent for rotation about an axis normal to the friction surfaces 59 and 62, and driving engagement means provided by a knob 66 integral and co-axial with the disk 61 that is in the shape of a hex nut which provides means for releasably connecting the friction disk 61 to a source of rotational power to rotate the friction disk 61 about its axis with the friction surfaces 59 and 62 in contact to heat the metal inner portion 54 and thereby melt the layer 58 of hot-melt adhesive by heat transfer through the metal inner portion 54. The means mounting the friction disk 61 in the socket 60 comprises a radially inwardly projecting rim 68 on the outer portion 52 that is loosely received in a circular recess 69 around the friction disk 61.

After the fastening assembly 50 has been mounted on a substrate, the knob 66 can serve as a seat for any of a variety of devices or implements.

Figure 5:
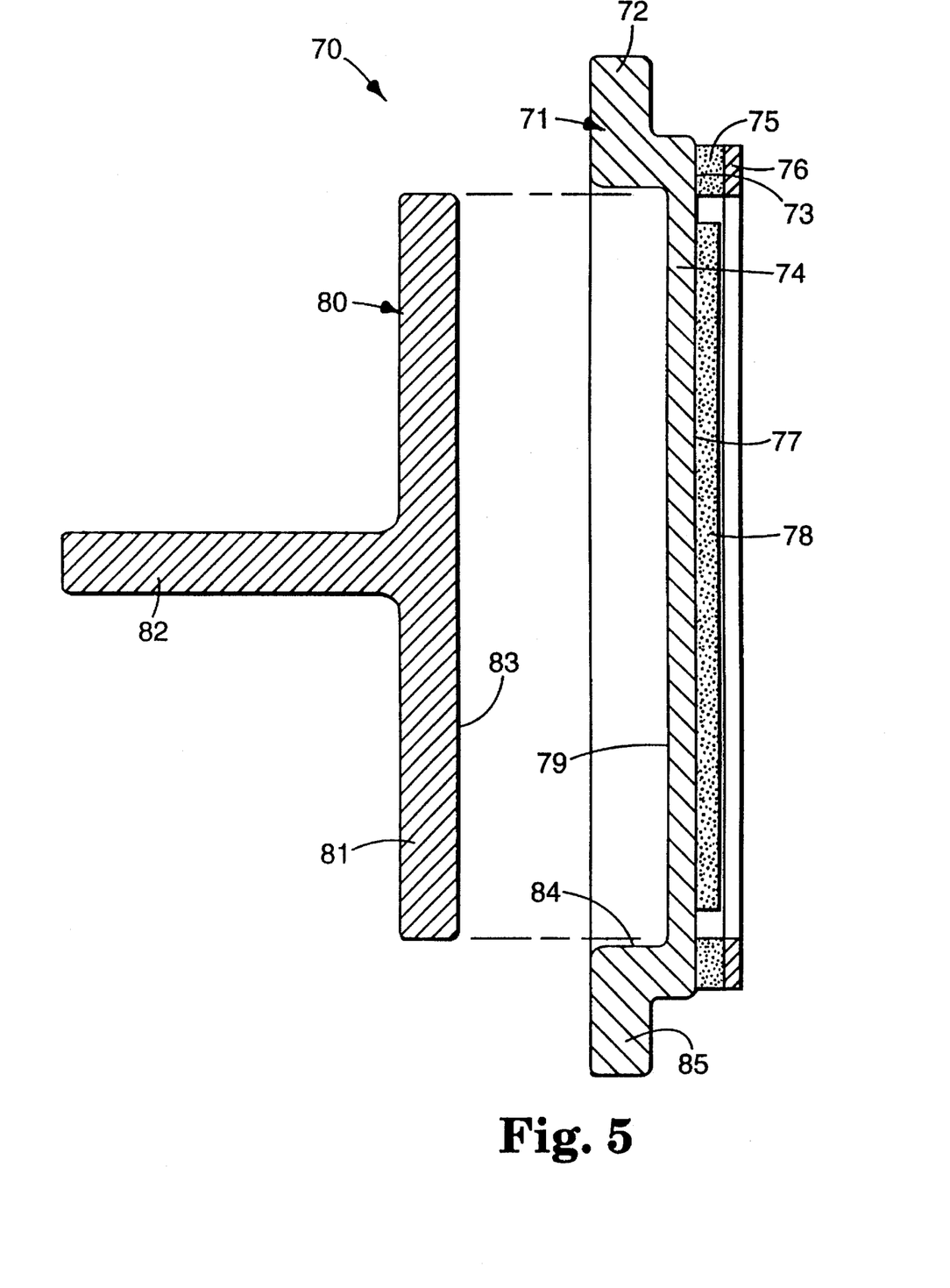
FIG. 5 is a central cross sectional view through a fourth embodiment of a quick-mounting fastening assembly according to the present invention.

FIG. 5 illustrates a quick-mounting fastening assembly 70 which, like the fastening assemblies 30 and 50 illustrated in FIGS. 3 and 4 respectively, can be easily removed after being bonded to a substrate. The fastening assembly 70 comprises a fastening structure 71 (which could be formed of polymeric material or metal) including a circular outer portion 72 which has an annular generally planar initial attachment surface 73 covered by a layer 75 of pressure-sensitive adhesive that preferably is a foamed or foam-like layer and is protected by a removable release liner 76. The fastening structure 71 also includes an inner portion 74 that has a main attachment surface 77 covered by a layer 78 of hot-melt adhesive that is slightly recessed with respect to the face of the layer 75 of pressure-sensitive adhesive, and a generally planar friction surface 79 opposite and generally parallel to its main attachment surface 77. The inner portion 74 has a thin cross sectional area, adapted to conduct heat energy between the friction surface 79 and the main attachment surface 77. The fastening structure 71 has a socket 84 defined by its surfaces including the friction surface 79.

To mount the fastening assembly 70 onto a substrate (not shown), the release liner 76 is removed and the layer 75 of pressure-sensitive adhesive is pressed against a flat surface of the substrate.

The fastening assembly 70 can then be firmly attached to the substrate using a tool such as the tool 80 illustrated which includes a disk 81 from which projects a coaxial cylindrical shank 82 that can be received and fixed in a chuck of a rotary driving tool. A flat circular friction surface 83 of the tool can be pressed into contact with the friction surface 79 of the inner portion 74 while the disk 81 is rotated to generate frictional heat that is transmitted through the inner portion 74 to melt and adhere the hot-melt adhesive layer 78 to the substrate after rotation of the disk 81 is stopped and the hot melt adhesive is again allowed to solidify.

The outer portion 72 comprises a flange 85 projecting radially outwardly of the outer periphery of the initial attachment surface 73. The flange 85 is spaced from the initial attachment surface 73 and the outer portion has a peripheral surface between the flange 85 and the outer periphery of the initial attachment surface 73 adapted to receive means for engaging the fastening assembly to seat various implements after the fastening assembly 70 has been mounted on a substrate.

Each of the fastening assemblies 30, 50 and 70 illustrated in FIGS. 3, 4 and 5, respectively, can be removed from a substrate by using a rotary tool to generate heat in the manner described above until the hot-melt adhesive softens.

Figure 6:
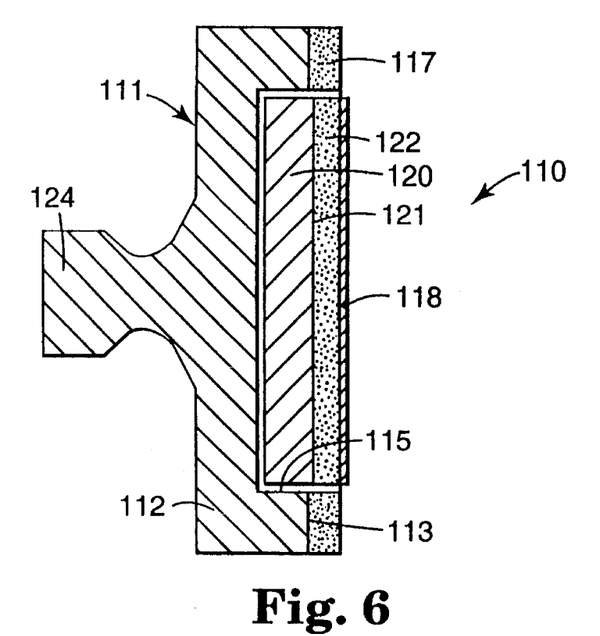
FIG. 6 is a central cross sectional view through a fifth embodiment of a quick-mounting fastening assembly according to the present invention.

FIG. 6 illustrates an embodiment of a quick-mounting fastening assembly according to the present invention generally designated by the reference numeral 110. The fastening assembly 110 includes a fastening structure 111 including a generally circular outer portion 112 which has an annular generally planar main attachment surface 113 and a central cylindrical socket 115 opening through the surface 113. Covering the main attachment surface 113 is an annular layer 117 of hot-melt adhesive. Coaxially positioned within the socket 115 is a generally cylindrical inner portion 120 of the fastening structure 111 that can be totally encompassed by the outer portion 112. The inner portion 120 has a planar initial attachment surface 121 that is approximately co-planar with the main attachment surface 113 and faces in the same direction as the main attachment surface 113. The initial attachment surface 121 is covered by a layer 122 of pressure sensitive adhesive that preferably is a foamed or foam-like layer and is protected by a removable release liner 118. The outer portion 112 also includes a stud-like part 124 projecting from the side of the outer portion 112 opposite its main attachment surface 113, which stud-like part 124 has a periphery with an hexagonal cross section that is coaxial with the stud-like part 124, the main attachment surface 113, and the socket 115.

To use the fastening assembly 110, the inner portion 120 is separated from the outer portion 112, the layer 122 of pressure-sensitive adhesive (after removal of the release liner 118) is adhered at a desired location along a flat substrate, the outer portion 112 is positioned around the inner portion 120 with the exposed face of the layer 117 of hot-melt adhesive in contact with the substrate and is rotated by a rotary tool (not shown) in driving engagement with the hexagonal surface of the stud like part 124 to melt the layer 117 of hot-melt adhesive. As soon as the layer 117 of hot-melt adhesive melts, the tool is stopped, and the layer 117 of melted hot-melt adhesive quickly congeals or solidifies to bond the fastening assembly 110 to the substrate. Any of a variety of devices such as a flexible clip that can retain cables, wires, cords, and the like can then be attached to the peripheral surface and/or the stud like part 124 of the outer portion 112.

Figure 7:
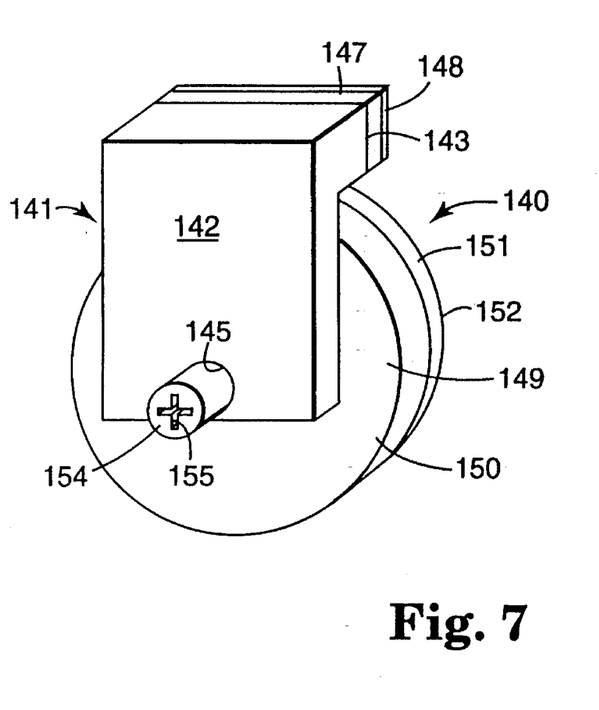
FIG. 7 is a rear top right perspective view of a sixth embodiment of a quick-mounting fastening assembly according to the present invention.

FIG. 7 illustrates a quick-mounting fastening assembly 140 according to the present invention that includes a fastening structure 141. The fastening structure 141 includes a generally L-shaped outer portion 142 which has a generally rectangular planar initial attachment surface 143 at the distal end of one leg and a transverse opening 145 through it's other leg. Covering the attachment surface 143 is a layer 147 of pressure-sensitive adhesive that preferably is a foamed or foam-like layer and is protected by a removable release liner 148. Coaxially positioned within the central opening 145 of the outer portion 142 is a generally cylindrical stud-like part 154 of an inner portion 150 of the fastening structure 141 that coaxially projects from the side of a disk-shaped part 149 of that inner portion 150. The disk-shaped part 149 of the inner portion 150 has a planar main attachment surface 151 on its side opposite the stud-like part 154 that is approximately co-planar with the initial attachment surface 143 and faces in the same direction as the initial attachment surface 143. The main attachment surface 151 is covered by a layer 152 of hot-melt adhesive. The stud-like part 154 is rotatable within the outer portion 142 and has a socket 155 shaped to receive the tip of a "Phillips" type screw driver (not shown) that is coaxial with the stud-like part 154.

To use the fastening assembly 140, the lawyer 147 of pressure-sensitive adhesive (after removal of the release liner 148) is pressed against and thereby adhered to a flat substrate, and the exposed face of the layer 152 of hot-melt adhesive is pushed into full contact with and rotated against the substrate by a rotary tool (not shown) in driving engagement in the socket 155 until the layer 152 of hot-melt adhesive melts. The tool is then stopped, whereupon the layer 152 of melted hot-melt adhesive quickly solidifies to bond the fastening assembly 140 to the substrate. The outer portion 142 or the stud-like part 154 can then be releasably engaged by any of a variety of devices such as a flexible clip that can retain cables, wires, cords, and the like.

Figures 8, 9:
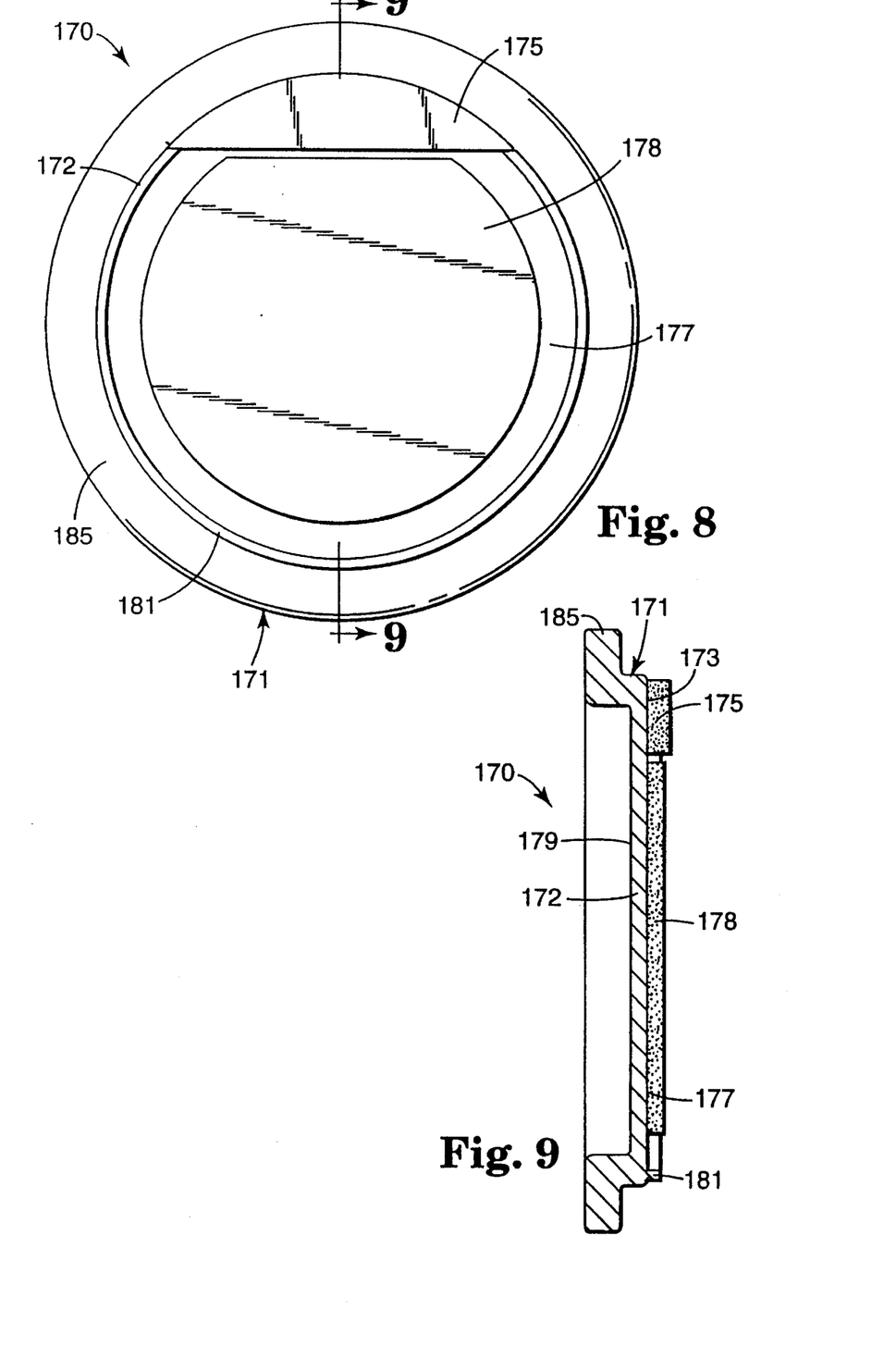
FIG. 8 is a front view of a seventh embodiment of a quick-mounting fastening assembly according to the present invention.
FIG. 9 is a sectional view taken approximately along line 9—9 of FIG. 8.

FIGS. 8 and 9 illustrate a quick-mounting fastening assembly 170 which, like the fastening assemblies 30, 50 and 70 illustrated in FIGS. 3, 4 and 5 respectively, can be easily removed after being bonded to a substrate. The fastening assembly 170 comprises a fastening structure 171 including a circular portion 172 which has a generally planar initial attachment surface 173 covered by a layer 175 of pressure-sensitive adhesive that preferably is a foamed or foam-like layer and can be protected by a removable release liner (not shown), and a main attachment surface 177 covered by a layer 178 of hot-melt adhesive, and a generally planar friction surface 179 opposite and generally parallel to its main attachment surface 177. The circular portion 172 has a thin cross sectional area adapted to conduct heat energy between the friction surface 179 and the main attachment surface 177. The fastening structure 171 has a socket 170 defined by its surfaces including the friction surface 179.

To mount the fastening assembly 170 onto a substrate (not shown), the release liner is removed and the layer 175 of pressure-sensitive adhesive is pressed against a flat surface of the substrate. The fastening assembly 170 can then be firmly attached to the substrate using a tool such as the tool 80 illustrated in FIG. 5 by pressing the friction surface 83 of the tool 80 into contact with the friction surface 179 while the disk 81 is rotated to generate frictional heat that is transmitted through the inner portion 174 to melt and adhere the hot-melt adhesive layer 178 to the substrate after rotation of the disk 81 is stopped and the layer 178 of hot melt adhesive is again allowed to solidify. The fastening structure 171 includes a semicircular rib 181 around the periphery of the layer 178 of hot melt adhesive that with the layer 175 of pressure sensitive adhesive provides a damn to retain the layer 178 of melt adhesive along the main attachment surface 177 when it is melted during application of the fastening assembly 170.

The fastening structure 171 also comprises a flange 185 projecting radially outwardly of the outer periphery of the surface 173. The flange 185 is spaced from the initial and main attachment surfaces 173 and 177 and the fastening structure 171 has a peripheral surface between the flange 185 and the outer periphery of those surfaces 173 and 177 adapted to receive means for engaging the fastening assembly to seat various implements after the fastening assembly 170 has been mounted on a substrate. The fastening assembly 170 can be removed from a substrate to which it has been attached by using the rotary tool 80 to generate heat in the manner described above until the layer 178 of hot-melt adhesive softens.

Testing

Fastening assemblies according to the present invention were tested by mounting them onto a vertical concrete barrier. When the inner portion of the novel fastening structure was a rotatable disk (as in FIGS. 1 and 2 of the drawing) bearing a typical hot-melt adhesive, the adhesive fused within three seconds by driving the disk with an ordinary household drill. When the inner portion was of aluminum as in FIG. 4 of the drawing, a typical hot-melt adhesive fused within five seconds. When the inner portion was of polymeric material (as in FIGS. 3 and 5 of the drawing) and had a thickness of about 0.75 mm (0.030 inch), a typical hot-melt adhesive fused within ten seconds. About one minute after the household drill had been retracted, each fastening assembly had become securely bonded to the wall and could not be knocked loose without destroying the surface of the wall. Hence, each could be put to immediate use to support or mount articles such as a fixture, a picture, garments, or a conduit.

Removal of mounted fastening assemblies like those of FIGS. 3 and 5 required about 20 seconds of spinning by the rotary tool. I believe that removal required more time than mounting because of heat dissipation into the concrete.

In spite of what is said in the above-cited Cearlock patent, I have never encountered degradation of a hot-melt adhesive, even when continuing the spinning for more than a minute after melting. When a hot-melt adhesive covers a flat face of a rotatable disk, as in the fastening assembly 10 of FIGS. 1 and 2, a melted hot-melt adhesive acts as a lubricant and so does not become significantly hotter than the temperature at which it melts. When a fastening assembly according to the present invention has a polymeric inner portion that separates the hot-melt adhesive from a rotatable disk (as in the fastening assembly 30 of FIG. 3 or in the fastening assembly 70 of FIG. 5), insufficient heat can be conducted through the inner portion to degrade the hot melt adhesive, no matter how long the spinning continues. However, care should be employed not to continue the spinning to the point of damaging the inner portion.

The present invention has now been described with reference to several embodiments thereof. It will be apparent to those skilled in the art that many changes can be made in the embodiments described without departing from the scope of the present invention. Thus, the scope of the present invention should not be limited to the structures described in this application, but only by the structures described by the language of the claims and the equivalents thereof.

I claim:

1. A quick-mounting fastening assembly comprising:

a fastening structure having an initial attachment surface, and a main attachment surface that is approximately co-planar with said initial attachment surface;

a layer of pressure-sensitive adhesive on said initial attachment surface that affords adhering the fastening structure to a surface of a substrate by pressing the layer of pressure sensitive adhesive against the substrate;

a layer of solidified hot-melt adhesive on said main attachment surface; and frictional heating means for affording sufficient frictionally heating to melt the layer of hot-melt adhesive with the layer of pressure sensitive adhesive adhered to a substrate so that when it again solidifies, the layer of hot melt adhesive will be adhered to the substrate.

2. A fastening assembly according to claim 1 wherein said fastening structure includes an inner portion having said main attachment surface; and an outer portion having said initial attachment surface, with said initial attachment surface encompassing said main attachment surface.

3. A fastening assembly according to claim 2 wherein said outer portion has a through circular opening; said inner portion is generally circular about an axis normal to said main attachment surface and has a side opposite said main attachment surface; said inner and outer portions include means mounting said inner portion for unlimited rotation within said outer portion, and said frictional heating means comprises driving engagement means on said inner portion for releasably connecting said inner portion to a source of rotational power to rotate said inner portion about said axis with said layer of hot-melt adhesive in contact with said substrate surface to melt said layer of hot-melt adhesive.

4. A fastening assembly according to claim 3 wherein said driving engagement means comprises surfaces of said inner portion defining a socket adapted to closely receive an end of a drive member, said socket being co-axial with said inner portion and opening through the side of said inner portion opposite said main attachment surface.

5. A fastening assembly according to claim 3 wherein said inner portion includes a stud-like part projecting coaxially on the side of said inner portion opposite said main attachment surface beyond said outer portion, and said driving engagement means are formed on said stud-like part.

6. A fastening assembly according to claim 3 wherein said initial attachment surface is annular and has an outer periphery, and said outer portion comprises a flange projecting radially outwardly of the outer periphery of said initial attachment surface, said flange being spaced from said initial attachment surface and said outer portion having a peripheral surface between said flange and the outer periphery of said initial attachment surface adapted to receive means for engaging the fastening assembly.

7. A fastening assembly according to claim 2 wherein said inner portion has a generally planar friction surface opposite and generally parallel to said main attachment surface, said inner portion is of heat stable material and has a cross sectional area adapted to conduct heat energy between said friction surface and said main attachment surface, and said fastening structure has a socket defined by surfaces including said friction surface adapted to receive and have a friction disk having a planar friction surface rotated therein with the planar friction surface on the friction disk in contact with said friction surface on said inner surface to heat and thereby melt said layer of hot-melt adhesive by heat transfer through said inner portion.

8. A fastening assembly according to claim 7 wherein said inner portion comprises heat-resistant polymeric material.

9. A fastening assembly according to claim 7 wherein said initial attachment surface is annular and has an outer periphery, and said outer portion comprises a flange projecting radially outwardly of the outer periphery of said initial attachment surface, said flange being spaced from said initial attachment surface and said outer portion having a peripheral surface between said flange and the outer periphery of said initial attachment surface adapted to receive means for engaging the fastening assembly.

10. A fastening assembly according to claim 1 wherein said fastening structure includes a main portion having said main attachment surface, and an outer portion having said initial attachment surface; said outer portion has a through circular opening; said main portion is generally circular about an axis normal to said main attachment surface and has a side opposite said main attachment surface; said main and outer portions include means mounting said main portion for unlimited rotation on said outer portion, and said frictional heating means comprises driving engagement means on said main portion for releasably connecting said main portion to a source of rotational power to rotate said main portion about said axis with said layer of hot-melt adhesive in contact with said substrate surface to melt said layer of hot-melt adhesive.

11. A fastening assembly according to claim 10 wherein said driving engagement means comprises surfaces of said main portion defining a socket shaped to closely receive the end of a drive member, said socket being co-axial with said main portion and opening through the side of said main portion opposite said main attachment surface.

12. A fastening assembly according to claim 10 wherein said main portion includes a stud-like part projecting coaxially on the side of said main portion opposite said main attachment surface beyond said outer portion, and said driving engagement means are formed on said stud-like part.

13. A fastening assembly according to claim 1 wherein said fastening structure includes an inner portion having said initial attachment surface; and an outer portion having said main attachment surface; said outer portion has a socket opening through said main attachment surface; said outer portion is generally annular about an axis normal to said main attachment surface; said outer portion is adapted for rotation about said inner portion with said inner portion in said socket, and said frictional heating means comprises driving engagement means on said outer portion for releasably connecting said outer portion to a source of rotational power to rotate said outer portion about said axis with said layer of hot-melt adhesive in contact with said substrate surface to melt said layer of hot-melt adhesive.

14. A fastening assembly according to claim 1 wherein said fastening structure has a generally planar friction surface opposite and generally parallel to said main attachment surface, is of heat stable material and is adapted to conduct heat energy between said friction surface and said main attachment surface, and has a socket defined by surfaces including said friction surface adapted to receive and have a friction disk having a planar friction surface rotated therein with the planar friction surface on said friction disk in contact with said friction surface on said inner surface to heat and thereby melt said layer of hot-melt adhesive by heat transfer through said fastening structure.

15. A quick-mounting fastening assembly comprising:

a fastening structure including an inner portion having said main attachment surface and an outer portion having said initial attachment surface that is approximately co-planar with said initial attachment surface with said initial attachment surface encompassing said main attachment surface; a layer of pressure-sensitive adhesive on said initial attachment surface that affords adhering the fastening structure to a surface of a substrate by pressing the layer of pressure sensitive adhesive against the substrate; and a layer of hot-melt adhesive on said main attachment surface; and frictional heating means for affording sufficient frictional heating to melt the layer of hot-melt adhesive with the layer of pressure sensitive adhesive adhered to a substrate so that when it again solidifies, the layer of hot melt adhesive will be adhered to the substrate, said friction heating means comprising said inner portion having a generally planar friction surface opposite and generally parallel to said main attachment surface, said inner portion having a cross sectional area adapted to conduct heat energy between said friction surface and said main attachment surface, said fastening structure having a socket defined by surfaces including said friction surface, and said fastening assembly further including a friction disk having a planar friction surface, a side opposite said friction surface, means mounting said friction disk in said socket with said friction surfaces adjacent for rotation about an axis normal to said friction surfaces, and driving engagement means on said friction disk for releasably connecting said friction disk to a source of rotational power to rotate said friction disk about said axis with said friction surfaces in contact to heat said inner portion and thereby melt said layer of hot-melt adhesive by heat transfer through said inner portion.

16. A fastening assembly according to claim 15 wherein said inner portion comprises metal.

17. A fastening assembly according to claim 15 wherein said inner portion comprises heat-resistant polymeric material.

18. A fastening assembly according to claim 15 wherein said driving engagement means comprises surfaces of said frictional disk defining a socket adapted to closely receive an end of a Phillips screwdriver, said socket being co-axial with said disk and opening through the side of said disk opposite said friction surface.

19. A fastening assembly according to claim 15 wherein said frictional disk includes a stud-like part projecting coaxially on the side of said disk opposite said frictional surfaces beyond inner and outer portions, and said driving engagement means are formed on said stud-like part.

20. A fastening assembly according to claim 15 wherein said initial attachment surface is annular and has an outer periphery, and said outer portion comprises a flange projecting radially outwardly of the outer periphery of said initial attachment surface, said flange being spaced from said initial attachment surface and said outer portion having a peripheral surface between said flange and the outer periphery of said initial attachment surface adapted to receive means for engaging the fastening assembly.

* * * * *